(12) United States Patent
Totani

(10) Patent No.: US 8,517,713 B2
(45) Date of Patent: *Aug. 27, 2013

(54) PLASTIC FILM STRETCHING APPARATUS

(75) Inventor: Mikio Totani, Kyoto (JP)

(73) Assignee: Totani Corporation, Kyoto (JP)

( * ) Notice: Subject to any disclaimer, the term of this patent is extended or adjusted under 35 U.S.C. 154(b) by 373 days.

This patent is subject to a terminal disclaimer.

(21) Appl. No.: 12/988,877

(22) PCT Filed: Apr. 24, 2009

(86) PCT No.: PCT/JP2009/058211
§ 371 (c)(1),
(2), (4) Date: Oct. 21, 2010

(87) PCT Pub. No.: WO2009/131226
PCT Pub. Date: Oct. 29, 2009

(65) Prior Publication Data
US 2011/0038978 A1 Feb. 17, 2011

(30) Foreign Application Priority Data

Apr. 24, 2008 (JP) .................................. 2008-114341

(51) Int. Cl.
*B29C 55/18* (2006.01)
(52) U.S. Cl.
USPC .......................................... 425/367; 425/374

(58) Field of Classification Search
USPC ............................ 425/66, 328, 367, 373, 374
See application file for complete search history.

(56) References Cited

U.S. PATENT DOCUMENTS 3,948,709 A * 4/1976 Ida et al. ....................... 156/209

FOREIGN PATENT DOCUMENTS

| JP | 46041722 | 9/1971 |
| JP | 4913503 | 6/1974 |
| JP | 2003-048260 | 2/2003 |

* cited by examiner

*Primary Examiner* — Joseph S Del Sole
*Assistant Examiner* — Ryan Ochylski
(74) *Attorney, Agent, or Firm* — Kirschstein, et al.

(57) ABSTRACT

(A1) Translate this text A plastic film (1) is drawn by a method different from a conventional one. The plastic film is intermittently fed in the longitudinal direction. A drawing member and a support base are installed in a plastic film feeding path, oppositely to each other, on both sides of the plastic film in the thickness direction. When the plastic film is temporarily stopped, the drawing member advances toward the support base between the lateral both side edges of the plastic film and is pressed against the plastic film and the support base to draw the plastic film in the longitudinal direction. Then, the drawing member retreats from the support base, and is separated from the plastic film.

5 Claims, 6 Drawing Sheets a b

PLASTIC FILM STRETCHING APPARATUS

TECHNICAL FIELD

The invention relates to an apparatus for stretching a plastic film longitudinally thereof.

BACKGROUND

There has heretofore been proposed an apparatus for stretching a plastic film longitudinally thereof to correct a pitch at which a pattern is printed on the plastic film repeatedly, as disclosed in Japanese Laid-Open Patent Publication No. 48,260 of 2003.

The apparatus includes heating means for heating and stretching the plastic film. However, the plastic film is not always suitable for heating and stretching. In this connection, it is desired to stretch the plastic film in a way different from the apparatus.

It is therefore an object of the invention to provide an apparatus for stretching a plastic film longitudinally thereof in a way different from the prior art.

SUMMARY OF THE INVENTION

According to the invention, the apparatus includes plastic film feeding means by which the plastic film is fed longitudinally thereof and intermittently, the plastic film having opposite surfaces and opposite side edges. The apparatus further includes a stretching member and a board disposed on opposite sides of the plastic film to be opposed to the surfaces of the plastic film and to each other when the plastic film is fed longitudinally thereof. The apparatus further includes drive means by which the stretching member is advanced toward the board to be pressed against the plastic film and the board between the side edges of the plastic film to stretch the plastic film longitudinally thereof when the plastic film is stopped temporarily. The stretching member is then retracted from the board and kept apart from the plastic film.

In a preferred embodiment, the stretching member comprises a plate including a tapered linear edge and extending widthwise of the plastic film. The linear edge is opposed to the board. The plate is advanced toward the board so that the linear edge can be pressed against the plastic film between the side edges of the plastic film. The plate is then retracted from the board so that the linear edge can be kept apart from the board.

The plate may be moved slightly and longitudinally of the plastic film after being retracted and then advanced and retracted again.

The plate may be moved slightly, advanced and retracted at few times during the plastic film is stopped temporarily.

A plurality of cylinders may be arranged widthwise of the plastic film and connected to the plate so that the plate can be advanced by the cylinders.

In another embodiment, the stretching member comprises a plurality of rollers each of which includes a circumferential edge having a circular axial section. The rollers are arranged widthwise of the plastic film and mounted on a beam. The circumferential edge is opposed to the board. The beam is advanced toward the board to make the circumferential edge pressed against the plastic film between the side edges of the plastic film. The beam is then moved widthwise of the plastic film so that the rollers can be rolled widthwise of the plastic film. The beam is then retracted from the board so that the circumferential edge can be kept apart from the plastic film.

The rollers may be arranged at a pitch. The beam is moved at a stroke corresponding to the pitch so that the rollers can be rolled at the stroke corresponding to the pitch.

The beam may be moved back to the original position after being retracted. The beam is then advanced, moved and retracted again.

The beam may be advanced, moved and retracted at few times during the plastic film is stopped temporarily.

A plurality of rollers may be overlapped with each other axially thereof and mounted on the beam.

In another embodiment, the stretching member comprises an elongated rod extending widthwise of the plastic film. The rod is advanced toward the board to be pressed against the plastic film between the side edges of the plastic film. The rod is then retracted from the board and kept apart from the plastic film.

The rod may be moved slightly and longitudinally of the plastic film after being retracted. The rod is then advanced and retracted again.

The rod may be moved slightly, advanced and retracted at few times during the plastic film is stopped temporarily.

In another embodiment, the stretching member includes an elongated rod extending widthwise of the plastic film and opposed to the board. A plurality of rollers are arranged widthwise of the plastic film, mounted on a beam and engaged with the rod. The beam is advanced toward the board so that the rod can be pressed against the plastic film by the rollers. The beam is then moved longitudinally of the plastic film so that the rod can be guided by the rollers to be roiled longitudinally of the plastic film. The beam is then retracted from the board so that the rod can be kept apart from the plastic film.

In another embodiment, the stretching member comprises a plate including an end portion at which a curved surface is formed to be curved about a center and opposed to the board. The plate is advanced toward the board to make the curved surface pressed against the plastic film between the side edges of the plastic film. The plate is then moved swingingly about the center of the curved surface to be rolled longitudinally of the plastic film. The plate is then retracted from the board so that the curved surface can be kept apart from the plastic film.

BEST MODE TO CARRY OUT THE INVENTION

Embodiments of the invention are as follows.

Figure 1:
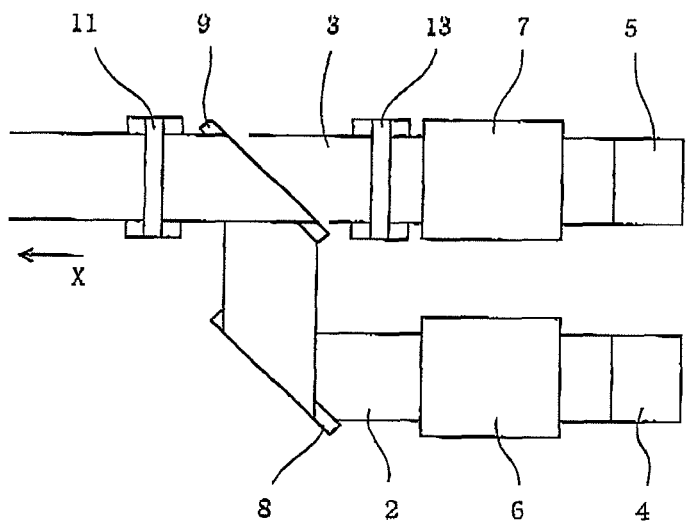
FIG. 1 is a plan view (a) and a side view (b) of a preferred embodiment of the invention.
Figure 1:
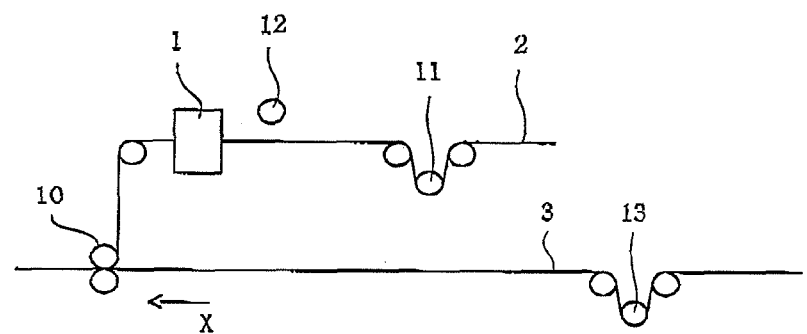

Turning now to the drawings, FIG. 1 illustrates an apparatus 1 according to the invention. In the embodiment, the apparatus 1 is incorporated into an installation for successively making plastic bags in which two plastic films 2 and 3 are supplied from rolls 4 and 5 and accumulated in accumulators 6 and 7. One of the plastic films 2 is then directed to turn bars 8 and 9 to be changed in direction and disposed on the upper side of the other plastic film 3. In addition, the apparatus 1 includes plastic film feeding means comprising feed rollers 10 and combined with the apparatus 1, one of the plastic films 2 being directed to a dancer roller 11, a mark sensor 12, the apparatus 1 and the feed rollers 10. The other plastic film 3 is directed to a dancer roller 13 and the feed rollers 10. The plastic films 2 and 3 are superposed on each other when being directed to the feed rollers 10. The apparatus 1 is arranged to stretch the plastic film 2 longitudinally thereof.

The feed rollers 10 are rotated by a drive motor so that the plastic films 2 and 3 can be fed longitudinally thereof and intermittently and stopped temporarily. The plastic films 2 and 3 are fed in a direction X which is horizontal. In addition, the plastic films 2 and 3 are heat sealed with each other by heat seal means and then cut by a cutter whenever being fed intermittently and when being stopped temporarily to successively make plastic bags, as in the case of the installation of Japanese Laid-Open Patent Publication No. 48,260 of 2003.

In the embodiment, the dancer rollers 11 and 13 give the plastic films 2 and 3 tensions. Each of the plastic films 2 and 3 has a pattern printed thereon and a mark placed thereon repeatedly at a pitch. The mark sensors 12 detect the marks of the plastic films 2 and 3 to generate signals. The apparatus 1 stretches one of the plastic films 2 longitudinally thereof in response to the signals to correct the pitch at which the pattern is printed on the plastic film 2 repeatedly, resulting in no discrepancy in pattern between the plastic films 2 and 3.

Figure 2:
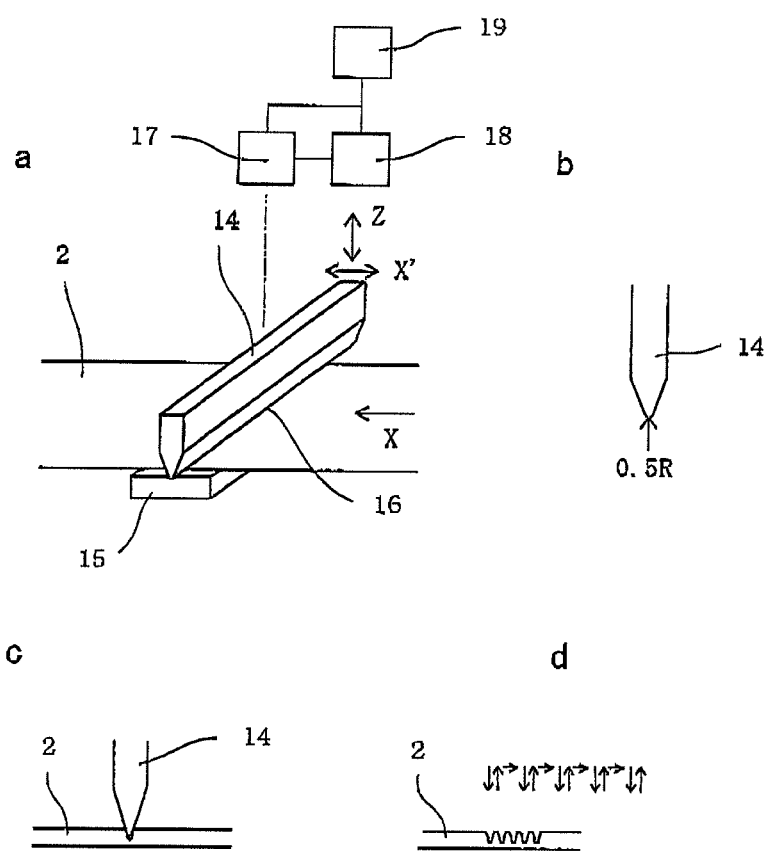
FIG. 2 is a perspective view (a), a side view (b), a sectional view (c) and an explanatory view (d) of the apparatus of FIG. 1.

In the meantime, the apparatus 1 includes a stretching member comprising a plate 14, as shown in FIG. 2. In this connection, it should be understood that the plastic film 2 has opposite surfaces and opposite side edges. The plate 14 and a board 15 are disposed on opposite sides of the plastic film 2 in a direction Z of thickness of the plastic film 2 to be opposed to the surfaces of the plastic film 2 and to each other when the plastic film 2 is fed longitudinally thereof. The apparatus 1 further includes drive means 17 connected to the plate 14. The plate 14 is advanced toward the board 15 by the drive means 17 to be pressed against the plastic film 2 and the board 15 between the side edges of the plastic film 2 to stretch the plastic film 2 longitudinally thereof when the plastic film 2 is stopped temporarily. The plate 14 is then retracted from the board 15 and kept from the plastic film 2.

In the embodiment, the plate 14 includes a tapered linear edge 16 and extends widthwise of the plastic film 2. The drive means 17 comprises a servo motor and a linkage. The liner edge 16 is opposed to the board 15. The plate 14 is advanced toward the board 15 in the direction Z so that the linear edge 16 can be pressed against the plastic film 2 between the side edges of the plastic film 2. The plate 14 is then retracted from the board 15 so that the linear edge 16 can be kept apart from the board 15. The linear edge 16 is curved along a circle having a radius of about 0.5 mm.

The apparatus can therefore stretch the plastic film 2 smoothly when the linear edge 16 is pressed against the plastic film 2.

In the embodiment, the apparatus further includes additional drive means 18 by which the plate 14 is moved slightly and longitudinally of the plastic film 2 or in the direction X'. The additional drive means 18 is connected to the drive means 17 and the plate 14. In addition, a control device 19 is connected to the drive means 17 and the additional drive means 18. The drive means 17 and the additional drive means 18 are controlled by the control device 19 so that the plate 14 can be moved slightly and longitudinally of the plastic film 2 by the additional drive means 18 after being retracted and then advanced and retracted again. The plate 14 is moved slightly, advanced and retracted at few times during the plastic film 2 is stopped temporarily.

The apparatus can therefore stretch the plastic film 2 effectively.

The plate 14 may be stopped by a stop when being advanced toward the board 15.

Figure 3:
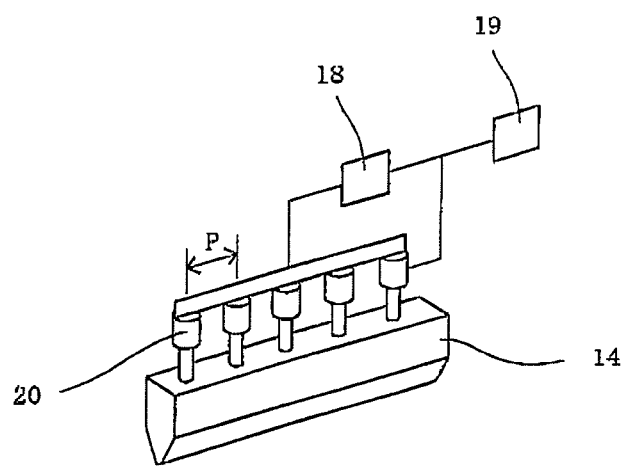
FIG. 3 is a perspective view of another embodiment.

In another embodiment of FIG. 3, the drive means comprises a plurality of cylinders 20 arranged widthwise of the plastic film 2 and connected to the plate 14 so that the plate 14 can be advanced by the cylinders 20. The cylinders 20 comprise air cylinders or electric cylinders. In the embodiment, the cylinders 20 are arranged at a pitch P of about 100 mm.

The plate 14 can therefore be advanced exactly so that the linear edge 16 can be pressed exactly.

Figure 4:
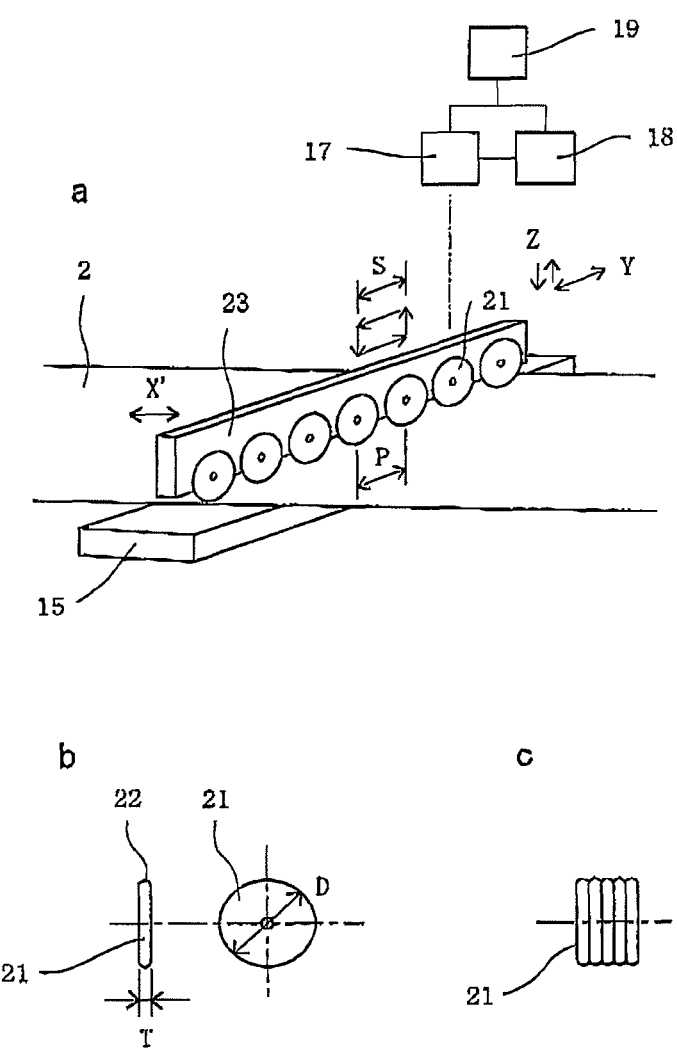
FIG. 4 is a perspective view (a), a side and elevational view (b) and a side view (c) of another embodiment.

In another embodiment of FIG. 4, the stretching member comprises a plurality of rollers 21 each of which includes a circumferential edge 22 having a circular axial section. The rollers 21 are arranged widthwise of the plastic film 2 or in a direction Y and mounted on a beam 23 for rotation. The circumferential edge 22 is opposed to the board 15. The drive means 17 is connected to the beam 23. The apparatus further includes additional drive mans 18 by which the beam 23 is moved widthwise of the plastic film or in the direction Y. In addition, a control device 19 is connected to the drive means 17 and the additional drive means 18. The drive means 17 and the additional drive means 18 are controlled by the control device 19 so that the beam 23 can be advanced toward the board 15 to make the circumferential edge 22 pressed against the plastic film 2 between the side edges of the plastic film 2. The beam 23 is then moved widthwise of the plastic film or in the direction Y by the additional drive means 18 so that the rollers 21 can be rolled widthwise of the plastic film 2. The beam 23 is then retracted from the board 15 so that the circumferential edge 22 can be kept apart from the plastic film 2.

In the embodiment, the rollers 21 are arranged at a pitch of about 34 mm. The beam 23 is advanced in the direction Z so that the rollers 21 can be pressed against the plastic film 2. The beam 23 is then moved widthwise of the plastic film 2 and at a stroke of about 34 mm so that the rollers 21 can be rolled widthwise of the plastic film 2 to stretch the plastic film 2. The beam 23 is then retracted from the board 15 to make the rollers 21 kept apart from the plastic film 2. The beam 23 is moved back widthwise of the plastic film 2 to the original position after being retracted. The beam 23 is then advanced, moved and retracted again. The beam 23 may be advanced, moved and retracted at few times during the plastic film 2 is stopped temporarily. Each of the rollers 21 has a diameter D of about 8 mm and a thickness T of about 0.5 mm. The circular edge 22 is curved along a circle having a radius of about 0.25 mm.

The beam 23 may be moved slightly and longitudinally of the plastic film 2 or in a direction X' and moved in the direction Z whenever being moved slightly so that the rollers 21 can be pressed against the plastic film 2 at few times. A plurality of rollers 21 may be overlapped with each other axially thereof and mounted on the beam 23.

Figure 5:
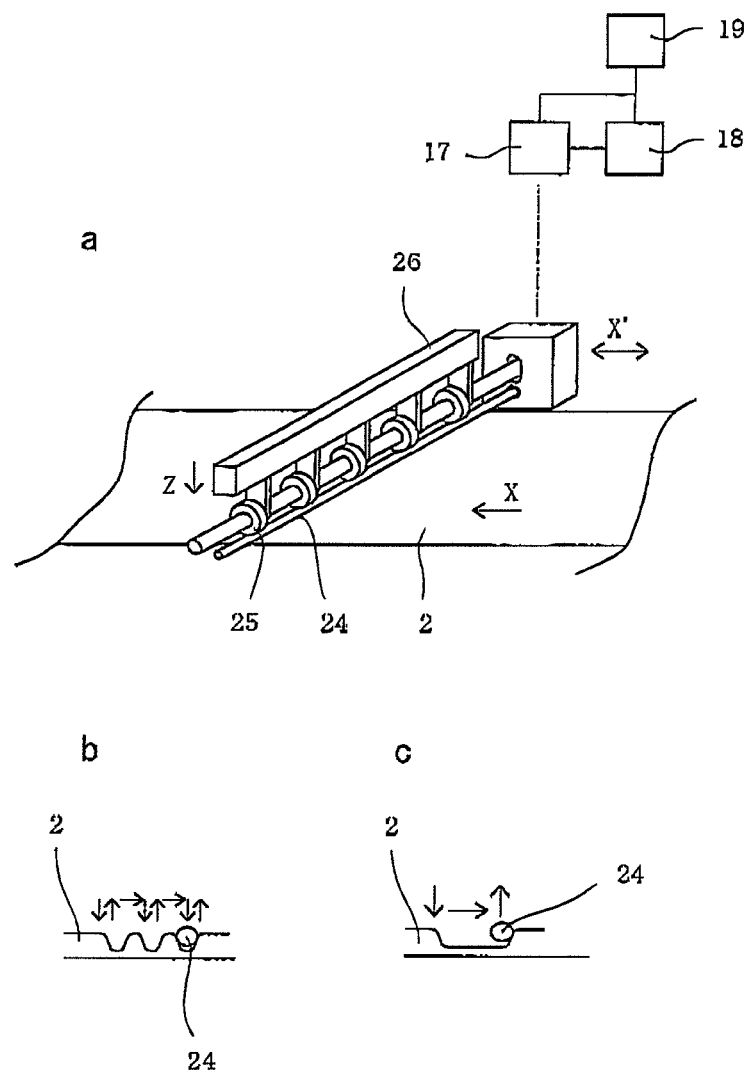
FIG. 5 is a perspective view (a), an explanatory view (b) and an explanatory view (c) of another embodiment.

In another embodiment of FIG. 5, the stretching member comprises an elongated rod 24 extending widthwise of the plastic film 2 or in the direction Y and opposed to the board 15. A plurality of rollers 25 are arranged widthwise of the plastic film 2, mounted on a beam 26 and engaged with the rod 24. The beam 26 is advanced toward the board 15 so that the rod 24 can be pressed against the plastic film 2 by the rollers 25 between the side edges of the plastic film 2. The beam 26 is then moved longitudinally of the plastic film 2 or in the direction X' so that the rod 24 can be guided by the rollers 25 to be rolled longitudinally of the plastic film 2. The beam 26 is then retracted from the board 15 so that the rod 24 can be kept apart from the plastic film 2.

The beam 26 may be moved slightly and longitudinally of the plastic film 2 or in the direction X' and moved in the direction Z whenever being moved slightly so that the rod 24 can be pressed against the plastic film 2 at few times. The beam 26 may be moved slightly and longitudinally of the plastic film 2 when the rod 24 is pressed so that the rod 24 can be pressed against and rolled along the plastic film 2.

Figure 6:
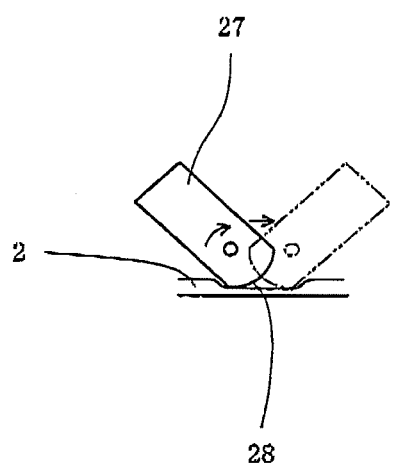
FIG. 6 is a side view (a) and a perspective view (b) of another embodiment.
Figure 6:
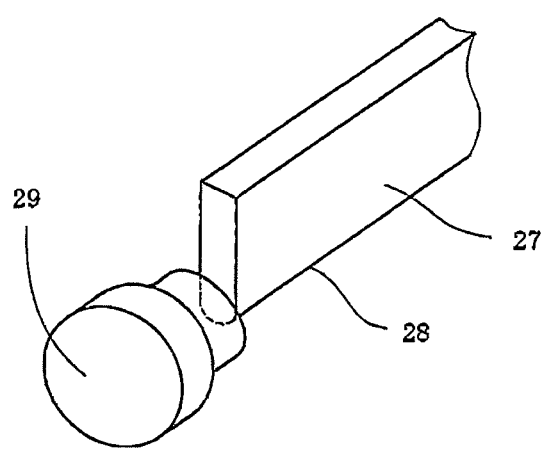

In another embodiment of FIG. 6, the stretching member comprises a plate 27 including an end portion at which a curved surface 28 is formed to be curved about a center and opposed to the board 15. The plate 27 is advanced toward the board 15 to make the curved surface 28 pressed against the plastic film 2 between the side edges of the plastic film 2. The plate 27 is then moved swingingly about the center of the curved surface 28 to be rolled longitudinally of the plastic film 2. The plate 27 is then retracted from the board 15 so that the curved surface 28 can be kept apart from the plastic film 2.

The plate 28 is fixed to trunnions which are supported by bearings 29 for rotation about a center aligned with the center of the curved surface 28.

What is claimed is:

1. An apparatus for stretching a plastic film longitudinally thereof, the apparatus comprising:
    a plastic film feeder by which the plastic film is fed longitudinally thereof and intermittently, the plastic film having opposite surfaces and opposite side edges;
    a stretching member and a board disposed on opposite sides of the plastic film to be opposed to the surfaces of the plastic film and to each other when the plastic film is fed longitudinally thereof; and
    a drive by which the stretching member is advanced toward the board to be pressed against the plastic film and the board between the side edges of the plastic film to stretch the plastic film longitudinally thereof when the plastic film is stopped temporarily, the stretching member being then retracted from the board and kept apart from the plastic film by the drive,
    wherein the stretching member comprises a plurality of rollers each of which includes a circumferential edge having a circular axial section, the rollers being arranged widthwise of the plastic film and mounted on a beam, the circumferential edge being opposed to the board, the drive being connected to the beam, the apparatus further comprising:
    an additional drive by which the beam is moved widthwise of the plastic film; and
    a control device connected to the drive and the additional drive, the drive and the additional drive being controlled by the control device so that the beam can be advanced toward the board to make the circumferential edge pressed against the plastic film between the side edges of the plastic film, the beam being then moved by the additional drive so that the rollers can be rolled widthwise of the plastic film, the beam being then retracted from the board so that the circumferential edge can be kept apart from the plastic film.

2. The apparatus as set forth in claim 1 wherein the rollers are arranged at a pitch, the beam being moved at a stroke corresponding to the pitch so that the rollers can be rolled at the stroke corresponding to the pitch.

3. The apparatus as set forth in claim 2 wherein the beam is moved back to the original position after being retracted, the beam being then advanced, moved and retracted again.

4. The apparatus as set forth in claim 3 wherein the beam is advanced, moved and retracted a few times while the plastic film is stopped temporarily.

5. The apparatus as set forth in claim 1 wherein a plurality of rollers are overlapped with each other axially thereof and mounted on the beam.

\* \* \* \* \*